Patented Jan. 3, 1933

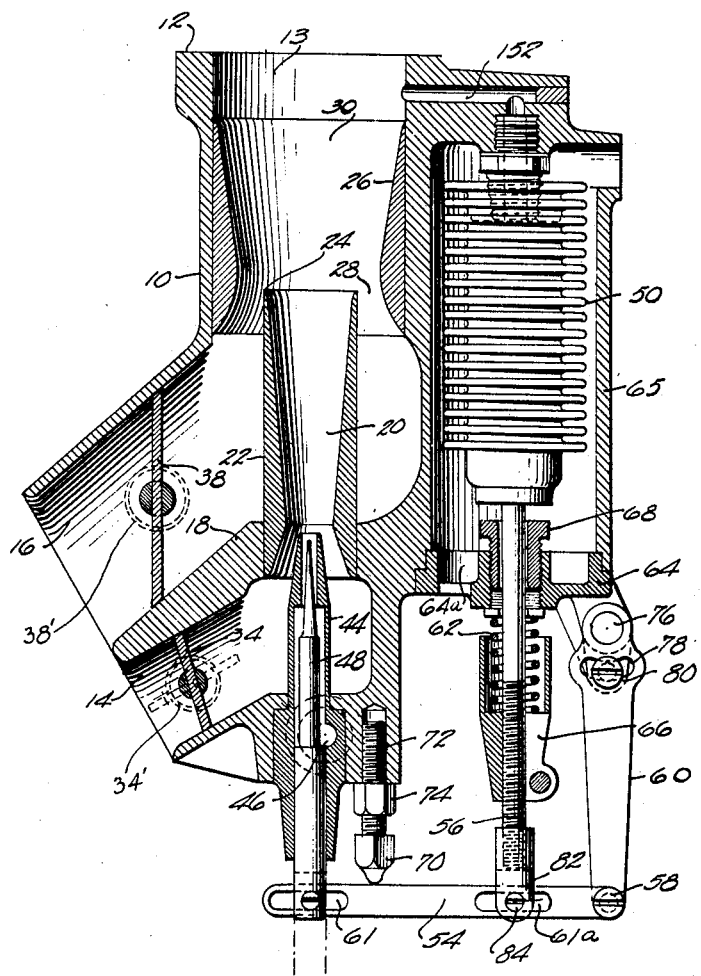

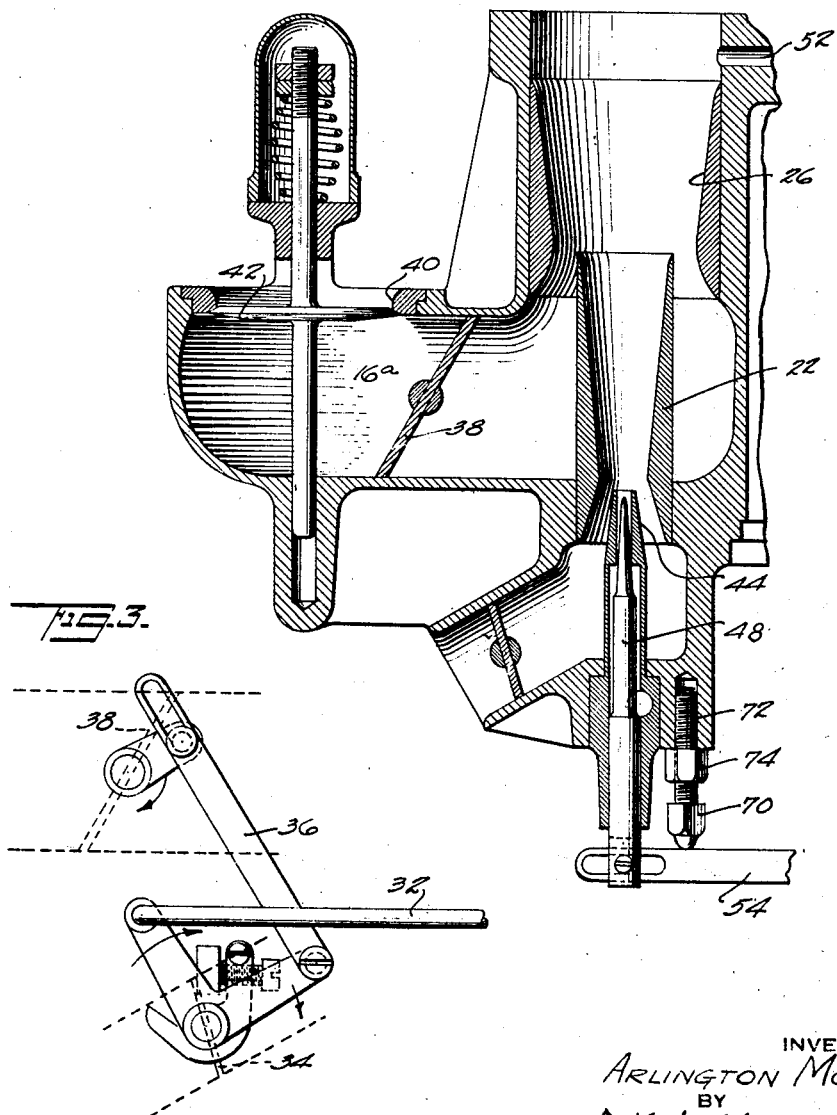

1,893,297

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

FUEL METERING CONTROL FOR INTERNAL COMBUSTION ENGINES

Application filed July 18, 1928. Serial No. 293,703.

My invention relates to a pressure differential fuel-metering apparatus for internal combustion engines, and particularly transportation engines subject to a wide momentary variations in power and speed. The invention has for its object the provision of a simple and efficient apparatus for utilizing the drop of pressure below atmospheric in the engine intake to meter the fuel in accordance with the engine requirements.

Another object is to provide means for mixing this fuel with suitable quantities of air to supply charge material for efficient engine operation throughout the power and speed ranges of engine operation. Still a further object is the utilizing of said pressure drop and air velocity past the fuel jet for lifting fluid from a supply level located below the fuel jet. Other objects will be plain from the following description.

The invention will be best understood from the following description of the form of apparatus illustrating its principle, that is shown in the accompanying drawings.

In said drawings:

Fig. 1 is a vertical cross-sectional view;

Fig. 2 is a view similar to Fig. 1 showing a modification; and

Fig. 3 is a detail view showing the throttle operating mechanism.

Reference character 10 designates a chambered casing or shell adapted to be secured at 12 to the intake manifold or intake manifold riser of the engine, and to supply charge mixture thereto through the passage 13.

Air is admitted to the chambered interior of shell 10 by two air inlet passages 14 and 16. These are separated, as by means of a partition 18. Air inlet passage 14 is for primary air, and all the air admitted therethrough passes through the Venturi passage 20 in the preferably elongated primary Venturi member 22. At its exit end 24 Venturi member 22 is encircled by the entrance end of the secondary Venturi member 26. All the air admitted through the secondary air inlet 16 passes around the primary Venturi member 22, into the Venturi member 26 through the annular orifice 28 between the two Venturi members, through the Venturi passage 30 in the secondary Venturi member 26 and out at 13 to the engine cylinders.

Provision is made for opening up the primary air inlet 14 first, and thereafter, as more air is required, opening up the secondary air inlet 16. In the form shown, the usual throttle rod 32 (Fig. 3) provided for the automobile engine, for example, operates a butterfly valve 34, in the primary air passage 14 and also, by means of a lost motion connecting link 36, operates the later opening butterfly valve 38 controlling the secondary air passage 16. These valves may be closed by any suitable means, as for example, be separate closing springs 34' and 38'. In addition to the butterfly gate valve 38 and outside thereof, as at the mouth 40 of passage 16ª, (Fig. 2), I may provide a spring opposed air inlet valve 42.

The fuel supply nozzle 44 is located at the region of the throat of enturi passage 20 in the primary Venturi member 22. Fuel is supplied at 46 from any suitable source, which may be located below nozzle 44, as long as the fuel lifting capacity of the apparatus is not exceeded.

The extent of opening of nozzle 44 is regulated by a modulating valve pin 48, and provision is made for operating said valve 48 in response to variations in the pressure difference between the engine intake passage and the outside atmosphere.

In the form shown, the interior of a pressure responsive bellows member 50 communicates through channel 152 with the passage 13 leading to the intake manifold at a point exteriorly of the venturis, and the bellows 50 operates a lever 54 by means of stem 56; and lever 54, pivoted at 58 to the adjustable arm 60, actuates the fuel modulating pin 48. Pivotal connections are preferably made by slots 61, 61a in lever 54 to facilitate adjustments.

Contracting movement of bellows 50 responsive to pressure reduction in passage 13 moves valve 48 toward its closing position. Such movement is opposed by the adjustable tension spring 62 encircling stem 56 and interposed between the closure 64 for the casing 65 enclosing the bellows 50, and the adjustable screw collar 66 on stem 56. The closure 64 has an opening 64ª therein for admitting air to the interior of the casing 65. Stem 56 is guided and bellows 50 kept straight by a guide bushing 68 adjustably threaded in an opening in the closure 64, and constituting an adjustable stop for limiting the expanding movement of the bellows 50 and retaining the same under initial tension.

As the pressure in bellows 50 rises the bellows (shown contracted at Fig. 1) expands and valve 48 is opened by this movement, which is assisted by the spring 62.

The contracting movement of the bellows is limited by the adjustable stop 70 threaded at 72 into the casing 10, and locked in position by a nut 74. As the bellows contracts, the lever 54 engages stop 70. The leverage of the lever 54 is controlled by adjustment of the arm 60 which is pivoted at 76 to a depending portion of the closure 64. The arm 60 below pivot 76 is provided with an arcuate slot 78 receiving the screw 80. When the screw is loosened, the arm 60 may be swung about its pivot 76 to adjusted position and secured by the screw 80. In order to adjustably vary the extent of movement of the pin 48 upon operation of the bellows, the pivotal connection between the stem 56 and lever 54 includes a member 82 threaded on the end of the stem 56 and carrying a pivot pin 84 riding in the slot 61ª. When the pivot pin 84 and lever 54 are disconnected from the member 82, the latter is adjusted through one or more 180° turns and the parts reconnected thereto. The angularity of the lever 54 is thus adjusted which controls the extent of movement of the pin 48 for a given movement of the bellows.

In operation, for small loads requiring charge flow substantially below the total piston displacement capacity, the primary air valve 34 only is open and all the air going to the engine passes through the primary Venturi passage 20. The pressure drop in the intake below atmospheric is considerable and the quantity of fuel is kept down to the small amount required by contraction of bellows 50 and resulting movement of valve 48 toward closing position. As more charge is required, the secondary air valve 38 is opened to a suitable extent, producing lessened pressure drop in the intake with consequent expansion of bellows 50 and opening up of the fuel passage. Upon the opening of the air throttling member there is a reduction in the influence of intake depression generally upon fuel lifting capacity at the jet 44, but this is compensated by the subjection of the jet to a double Venturi effect due to velocity energy of the incoming air passing through both Venturi passages. In this way fuel can be lifted to a substantial height throughout the full range of engine operation.

The pressure responsive element 50 has an inherent resiliency which is less than that required to oppose variation in intake depression throughout the range thereof, and the same is therefore supplemented by a spring means 62 of a strength to oppose contracting movement of the bellows to the limited extent determined by the position of the stops 68 and 70, the stop 70 preventing contraction of the bellows beyond its intake limits and the stop 68 retaining the bellows under initial tension so that the latter firmly seats in the former in the wide open position of the valve 48. The bellows 50 is thus constrained to vary substantially coextensively with the range of pressure variation, and the limited movement thereof is transmitted through the lever system 54 to move the valve 48 through the distance required to vary the fuel passage area from the minimum to the maximum also determined by the position of the stops 68 and 70.

It will be noted that, when the engine is stopped, the fuel nozzle is left wide open so that ample fuel is available for starting.

Among the features of advantage obtained are simplicity of construction, enabling expensive and troublesome idling and compensating jets and the like to be dispensed with and yet metering the fuel accurately for all requirements by means of the modulating pin operated by pressure drop and in substantially inverse relation thereto; there being no separate idling fuel passage the engine can be operated at high speed with the air throttle closed with the fuel practically entirely shut off automatically by the fuel valve due to its movement toward closing position under the influence of the high intake depression; there is no loading up of fuel on the intake passage walls at periods of engine deceleration; and the fuel is self-regulating for richness at all loads and speeds. The fuel jet discharges, especially at low engine loads, into a region of low pressure which aids materially in securing a thorough atomizing of the fuel and especially of the heavier ends thereof, and numerous other features of advantage are secured.

The scope of my invention is defined by my claims, by which I intend to include all that is new in the above disclosure.

I claim:

1. In charge mixing apparatus for transportation internal combustion engines, an air conduit, a primary venturi therein, a secondary venturi therein receiving the end of said primary venturi, a fuel nozzle disposed within said primary venturi, said nozzle being subject to the fuel lifting effects due to air flow through the venturi, separate air inlets to said venturis, throttles controlling said air inlets, a lost motion connection between the throttles for opening the air inlet to the primary venturi and the air inlet to the secondary venturi in succession and means for varying the fuel passage area.

2. In charge mixing apparatus for transportation internal combustion engines, a two part air inlet, the parts whereof are adapted for opening up in succession, tandem Venturi passage members in communication with said air passages respectively, fuel inlet means in the one of the venturi members whose air inlet opens first, and means responsive to pressure drop in the intake passage for varying the extent of opening of the fuel inlet in substantially inverse relation to the amount of said pressure drop.

3. In fuel supplying and metering apparatus for internal combustion engines, an air conduit adapted to communicate with the engine, a throttle therein, a venturi in said conduit, a fuel nozzle having the tip thereof disposed within said venturi above the level of the fuel supply, and adapted to be subjected at said tip to a reduction of pressure for effecting the elevation of fuel under atmospheric pressure and the delivery thereof to the air passing through said venturi, a modulating valve controlling the extent of opening of the fuel nozzle, an expansible-contractible element having one side thereof exposed to the intake pressure beyond said throttle, and the other side thereof exposed to atmospheric pressure, and a connection between said expansible-contractible element and said valve for varying the extent of opening of said nozzle in substantially inverse relation to the variations in intake depression.

4. In a charge mixing apparatus for transportation internal combustion engines, a venturi, a fuel inlet therein, a valved air inlet to the venturi, a second larger venturi higher than the first and into which the first venturi extends, a valved air inlet to the second venturi, a conduit from the second venturi to the engine cylinders, means responsive to pressure drop in said conduit below atmospheric for metering fuel supplied to the fuel inlet, and lost motion manually actuable means for first opening the air valve to the first venturi and then the air valves to both venturis.

5. In a fuel supplying apparatus for internal combustion engines, a fuel nozzle, a valve slidable therein, an expansible-contractible element, a stem extending therefrom, an adjustable bearing receiving said stem and constituting a stop for limiting the movement of said element in one direction, and a movable connection between said stem and said valve.

6. In fuel supplying apparatus for internal combustion engines, a fuel nozzle, a valve slidable therein, an expansible-contractible element, a stem extending therefrom, an adjustable bearing for guiding said stem and constituting a stop for limiting the expanding movement of said element, and retaining the same under initial tension, an axially adjustable abutment on said stem, a spring interposed between said abutment and said bearing, and serving to augment the inherent resiliency of said element, and a connection between said stem and said valve.

7. In a fuel supplying apparatus for internal combustion engines, a fuel nozzle, a valve slidable therein, an expansible-contractible element parallel with said valve, a stem extending from said element, an adjustable bearing for guiding said valve, and constituting a stop for limiting the expanding movement of said element, and retaining the same under initial tension, an abutment adjustable axially of said stem, a spring interposed between said abutment and said bearing, a pivoted support, means for locking the same in adjusted position, a member pivotally connected at one end to said support and having a pivotal slotted connection with said stem and said valve; certain of said connections being adjustable to control the relative movements of said stem and said valve, and adjustable means engageable with said last named member for limiting the contracting movement of said element.

8. In a charge mixing apparatus for transportation internal combustion engines, an air conduit, a primary venturi therein, a secondary venturi therein receiving the end of the primary venturi, said venturis having separate air inlets thereto, manually operated valves for controlling the air inlets and the engine operation, a fuel nozzle disposed within said primary venturi subject to the variations in intake depression in said conduit and in air flow through said venturi varying in inverse relation to each other as the air inlet opening is varied, and means for controlling the fuel passage area substantially in inverse relation to the variations in intake depression.

9. In charge mixing apparatus for internal combustion engines, an air conduit, a primary venturi therein, a secondary venturi therein receiving the end of the primary venturi, a fuel nozzle disposed within said primary venturi, said venturis having separate air inlets thereto, throttles controlling said air inlets and rendering said fuel nozzle subject to intake depression in said conduit at the inner side of the throttles and to air flow through said venturis varying in inverse relation to each other as the throttles move, a connection between the throttles for opening the air inlet to the primary venturi and the air inlet to the secondary venturi in succession, and means for varying the fuel flow in inverse relation to the intake depression.

10. In a fuel supplying and metering apparatus for internal combustion engines, an air conduit, means for controlling the air supply through the conduit, Venturi means disposed within the conduit beyond said air controlling means and traversed by the air passing the controlling means, a fuel supply nozzle associated with said Venturi means, subject to the intake depression in said conduit beyond said air controlling means and to air flow through the Venturi means varying in inverse relation to each other as the air controlling means is moved, and means for controlling the fuel flow to cause variation thereof in a direction to oppose the inductive effects of intake depression.

11. In a fuel supplying and metering apparatus for internal combustion engines, an air conduit, means for controlling the air supply through the conduit, Venturi means disposed within the conduit beyond said air controlling means and traversed by the air passing the controlling means, a fuel supply nozzle associated with said Venturi means, subject to the intake depression in said conduit beyond said air controlling means and to air flow through the Venturi means varying in inverse relation to each other as the air controlling means is moved, and pressure responsive means communicating with said conduit beyond said air controlling means and exteriorly of said Venturi means for varying the fuel flow in substantially inverse relation to the variations in intake depression.

12. In a fuel supplying and metering apparatus for internal combustion engines, an air conduit, a fuel jet in said conduit extending axially thereof, air controlling means in said conduit at the atmospheric side of said fuel jet serving to maintain in certain of the positions thereof a reduction in pressure in said conduit about said fuel jet; said reduction in pressure serving to effect delivery of fuel through said jet from a fuel supplying means, a venturi disposed in said conduit and receiving said fuel jet for maintaining a reduction in pressure about said fuel jet as said air controlling means opens; said venturi being traversed by the air passing said air controlling means and becoming more effective as the pressure reduction due to said air controlling means decreases, and means having a passage independent of the passage in said fuel jet in communication with said conduit at the inner side of said air controlling means and responding to the variations in pressure reduction in said conduit for automatically controlling the extent of opening of said fuel jet in inverse relation to the variations in pressure reduction occurring as the air controlling means is varied, and for effecting a balance between the extent of opening of said fuel jet and the reduction in pressure about the same, whereby to deliver fuel proportionately to the air delivered.

13. In apparatus for supplying and mixing charges for internal combustion engines, means for supplying fuel thereto, elastic pressure responsive means for controlling the fuel passage area, stop means for limiting the movement of said pressure responsive means in both directions and determining the minimum and maximum fuel passage openings, and spring means supplementing the resiliency of said pressure responsive means for opposing movement of said pressure responsive means as the pressure differential increases.

14. In apparatus for supplying and mixing charges for internal combustion engines, means for supplying fuel thereto, an elastic element operated by variations in pressure differential for controlling the fuel passage opening, stop means adapted to limit the movement of said elastic element in both directions and retain the same within its elastic limits, said stop means determining the minimum and maximum fuel passage openings, and a separate spring supplementing the inherent resiliency of said elastic element and opposing movement thereof as the pressure differential increases.

15. In apparatus for supplying and mixing charges for internal combustion engines, an intake, a fuel nozzle extending into the intake, a valve for controlling the flow of fuel therethrough, an expansible-contractible element including spring means responsive to variations in pressure differential, a stop at one end of said element, a stem extending from said end through said stop, a bracket, an arm pivoted at one end to said bracket and pivotally connected to said stem and said valve, a stop for limiting the contraction of said element, and a supplementing spring for opposing said contraction.

16. In apparatus for supplying and mixing charges for internal combustion engines, an intake, means for supplying fuel to the intake, a valve for controlling said fuel supplying means, an expansible-contractible element responsive to pressure variations and including spring means for opposing the contraction thereof, a stem extending from said element, a pivoted bracket adjustably securable in various positions about the pivot thereof, and an arm pivoted at one end to said bracket and pivotally connected to said stem and said valve.

17. In apparatus for supplying and mixing charges for internal combustion engines, an intake, means for supplying fuel to the intake, a valve for controlling said fuel supply means, a bellows responsive to pressure variations, a stop at one end of said bellows for limiting the expansion thereof, a stem on said bellows extending through said stop, a bracket, an arm pivoted at one end to said bracket and pivotally connected to said stem and said valve, an abutment axially adjustable upon said stem, a spring interposed between said abutment and said stop, and a stop for limiting the contraction of said bellows.

18. In apparatus for supplying and mixing charges for internal combustion engines, an intake, a throttle therein, means for supplying fuel to the intake, a valve for controlling said fuel supplying means, a bellows communicating at one end with said intake beyond said throttle, an adjustable bushing at the opposite end of the bellows for limiting the expanding movement thereof, a stem connected to the latter end of said bellows and passing through said bushing, a connection between said stem and said valve, a stop for limiting the contraction of said bellows, and a spring for opposing said contraction.

19. In apparatus for supplying and mixing charges for internal combustion engines, an intake conduit, means for controlling the passage of air through said conduit, means for conveying fuel to said conduit, a valve controlling the extent of opening of the fuel conveying means, an elastic element for actuating said valve in response to intake pressure variations constrained against movement in opposite directions beyond its elastic limits, and spring means supplementing the inherent resiliency of the element and serving to render the same sensitive in responding to variations in intake depression approximately throughout the range thereof.

20. In apparatus for supplying and mixing charges for internal combustion engines, an intake conduit, an air throttle therein, a fuel nozzle beyond the air throttle, a fuel valve, means for operating the fuel valve comprising an elastic air bellows subjected to the differential between atmospheric and intake pressures, means for limiting the bellows movement within its elastic limits, and spring means for opposing bellows movement due to said pressure differential, whereby to render the bellows responsive within the limits of movement thereof to pressure differences that in the absence of said spring means would cause the bellows to exceed its elastic limits.

21. In an internal combustion engine, an intake, a throttle therein, a venturi disposed in said intake at the engine side of the throttle, a fuel line terminating in said venturi, and subject to air flow therein and to the reduced static pressure at the engine side of the throttle and pressure responsive means in communication with the intake beyond said throttle and exteriorly of the venturi for varying the flow of fuel in direct relation to the variation in statical pressure in the intake, said pressure responsive means including spring means having a resistance sufficient to oppose the statical pressure substantially over the range thereof resulting from throttle movement.

22. In a charge mixing apparatus for internal combustion engines, an intake, Venturi means therein, air controlling means in said intake at the entrance side of said Venturi means, a fuel nozzle associated with said Venturi means to be subjected to the fuel lifting action of air flow through the Venturi means, and of the static pressure reduction at the engine side of the air controlling means, and means for counteracting the effects of the static pressure reduction in the intake on fuel flow, said means utilizing the static pressure reduction resulting from variations in the openings of the air controlling means to counteract the direct effects thereof on fuel flow to the exclusion of any counteracting effect by the Venturi pressure reduction, whereby to render the pressure reduction due to air flow solely effective in causing fuel flow directly therewith.

23. In a charge mixing apparatus for internal combustion engines, an air conduit, means for controlling the air supply through the conduit, Venturi means disposed within the conduit at the engine side of said air controlling means and traversed by the air passing the controlling means, a fuel supply nozzle associated with said Venturi means, said nozzle being subject to pressure reduction due to air flow through the Venturi means and to the static pressure reduction at the engine side of the air controlling means, and means for rendering the static pressure reduction at the engine side of the air controlling means and as the same varies with opening of the air controlling means effective in counteracting the direct effects thereof on fuel flow, said means communicating with the air conduit at a point exteriorly of said Venturi means.

24. In a charge mixing apparatus for internal combustion engines, an air conduit, a venturi therein, a smaller venturi received into said first venturi and terminating contiguous to the constriction thereof, said conduit having separate entrance passages to said venturis, means in said conduit at the Venturi entrance side for controlling the passage of air, a fuel nozzle having the discharge end thereof located in the second venturi contiguous to the constriction thereof, and valvular means for controlling the fuel passage area.

25. In a charge mixing apparatus for internal combustion engines, an air conduit, a venturi therein, a smaller venturi received into said first venturi and terminating contiguous to the constriction thereof, said conduit having separate entrance passages to said venturis, means in said conduit at the Venturi entrance side for controlling the passage of air, a fuel nozzle having the discharge end thereof located in the second venturi contiguous to the constriction thereof, and means for controlling the fuel flow to compensate for variations in the static pressure reduction in the air conduit at the engine side of the air controlling means.

26. In a charge mixing apparatus for internal combustion engines, an air conduit, a venturi therein, a smaller venturi extending into the first venturi, said conduit having separate entrance passages to said venturis, means in said conduit at the Venturi entrance side for controlling the passage of air, a fuel nozzle having the discharge end thereof located in the second venturi and subject to pressure reduction due to air flow through the venturis, and means for rendering the static pressure reduction at the engine side of the air controlling means effective in counteracting the direct effects thereof on fuel flow.

27. In a charge mixing apparatus for internal combustion engines, an air conduit, a venturi therein, a smaller venturi extending into the first venturi, said conduit having separate entrance passages to said venturis, means in said conduit at the Venturi entrance side for controlling the passage of air, a fuel nozzle having the discharge end thereof located in the second venturi and subject to pressure reduction due to air flow through the venturis, and means for rendering the static pressure reduction at the engine side of the air controlling means effective in counteracting the direct effects thereof on fuel flow, said last named means communicating with the air conduit at a point exteriorly of the venturis.

In testimony whereof, I have signed my name hereto.

ARLINGTON MOORE.